United States Patent
Ornum

(10) Patent No.: US 11,826,676 B2
(45) Date of Patent: Nov. 28, 2023

(54) FLOCCULANT COMPOSITION AND METHOD OF FORMING SAME

(71) Applicant: Komline-Sanderson Corporation, Peapack, NJ (US)

(72) Inventor: Jess Ornum, Andover, NJ (US)

(73) Assignee: KOMLINE-SANDERSON CORPORATION, Peapack, NJ (US)

( * ) Notice: Subject to any disclaimer, the term of this patent is extended or adjusted under 35 U.S.C. 154(b) by 316 days.

(21) Appl. No.: 17/406,476

(22) Filed: Aug. 19, 2021

(65) Prior Publication Data

US 2023/0053508 A1 Feb. 23, 2023

(51) Int. Cl.
 C02F 1/52 (2023.01)
 B01D 21/01 (2006.01)
 C02F 5/00 (2023.01)

(52) U.S. Cl.
 CPC ............. B01D 21/01 (2013.01); C02F 5/00 (2013.01)

(58) Field of Classification Search
 CPC ........ C02F 1/52; C02F 1/5209; C02F 1/5272; C02F 1/54; C02F 1/542
 See application file for complete search history.

(56) References Cited

U.S. PATENT DOCUMENTS

| | | | | |
|---|---|---|---|---|
| 4,670,158 A | * | 6/1987 | Kelly | C02F 1/24 |
| | | | | 210/705 |
| 7,410,589 B2 | * | 8/2008 | Lakshman | A01C 3/00 |
| | | | | 71/21 |
| 7,419,589 B2 | * | 9/2008 | Eserkaln | C02F 1/688 |
| | | | | 422/279 |
| 9,682,879 B2 | * | 6/2017 | Dube | C02F 1/5236 |
| 2005/0150823 A1 | * | 7/2005 | Eserkaln | C02F 1/688 |
| | | | | 210/123 |
| 2017/0240478 A1 | * | 8/2017 | Massai | C05G 5/23 |

FOREIGN PATENT DOCUMENTS

| CN | 101784722 A | * | 7/2010 | ............. C02F 11/14 |
|---|---|---|---|---|
| CN | 101899536 A | * | 12/2010 | |

OTHER PUBLICATIONS

Enhancement of Solubility and Biohydrogen Production from Sewage Sludge with Lime Mud Filtrate, Zhang et al., Water Air Soil Pollut (2018) 229: 129.*

* cited by examiner

*Primary Examiner* — Haidung D Nguyen
(74) *Attorney, Agent, or Firm* — Buckley, Maschoff & Talwalkar LLC

(57) ABSTRACT

According to some embodiments, a flocculated material, product and method for making the product are provided including providing a methanotrophic material having an amount of 2.68% Total Suspended Solids (TSS); treating the methanotrophic material with phosphoric acid; providing a lime solution in an amount of 0.0212 M; combining the treated methanotrophic material with the lime to increase a pH of the solution and to precipitate calcium phosphate; generating a flocculated material by flocculating the combined lime and treated methanotrophic material. Numerous other aspects are provided.

16 Claims, 4 Drawing Sheets

FLOCCULANT COMPOSITION AND METHOD OF FORMING SAME

BACKGROUND

Flocculation is a process whereby small particles in suspension are caused to aggregate, resulting in large clusters (flocs) that are much more easily separated from a medium than the original particles. Synthetic polymer flocculants and copolymers thereof are generally used as flocculants to flocculate/separate microparticles dispersed in a solution, such as water. However, when these synthetic polymer flocculants are used, the resulting separated materials may not be suitably safe for ingestion by (or application to) animals or application to products used by animals.

A flocculant mixture is desired that may result in separated materials that may be suitably safe for ingestion by animals or application to animals and/or products contacted by animals.

SUMMARY

According to some embodiments, a method is provided including providing a methanotrophic material having an amount of 2.68% TSS; treating the methanotrophic material with phosphoric acid; providing a lime solution in an amount of 0.0212 M; combining the treated methanotrophic material with the lime to increase a pH of the solution and to precipitate calcium phosphate; generating a flocculated material by flocculating the combined lime and treated methanotrophic material.

According to some embodiments, a flocculated material is provided including a methanotrophic material having an amount of 2.65% TSS suspended in a medium, the methanotrophic material including a dose of phosphoric acid, wherein the methanotrophic material is adapted to flocculate in lime, wherein the lime is in an amount of 0.0212M.

According to some embodiments a product is prepared by mixing a methanotrophic material with a medium to form a first mixture, wherein the methanotrophic material in the first mixture is present in a concentration of 1-3% TSS, wherein the methanotrophic material is treated with phosphoric acid prior to mixing; adding a lime solution to the first mixture to form a second mixture, wherein a ratio of the first mixture to the lime solution is about 83 to 1; and flocculating the second mixture to form a plurality of flocs, wherein the flocs are a product.

Some technical advantages of some embodiments disclosed herein are the generation of a flocculated material that is suitably safe for ingestion by animals or application to animals and/or products contacted by animals. Another technical advantage of some embodiments disclosed herein is the generation of a flocculated material that has anti-fouling properties when dried.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

Figure 1:
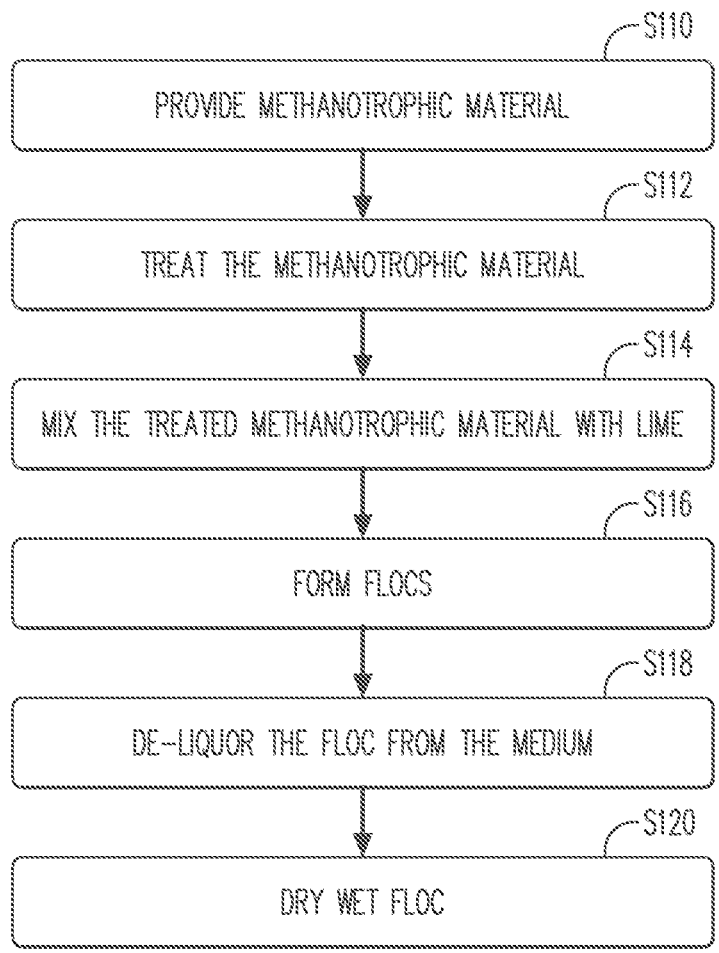
FIG. 1 is a block diagram according to some embodiments.
Figure 2:
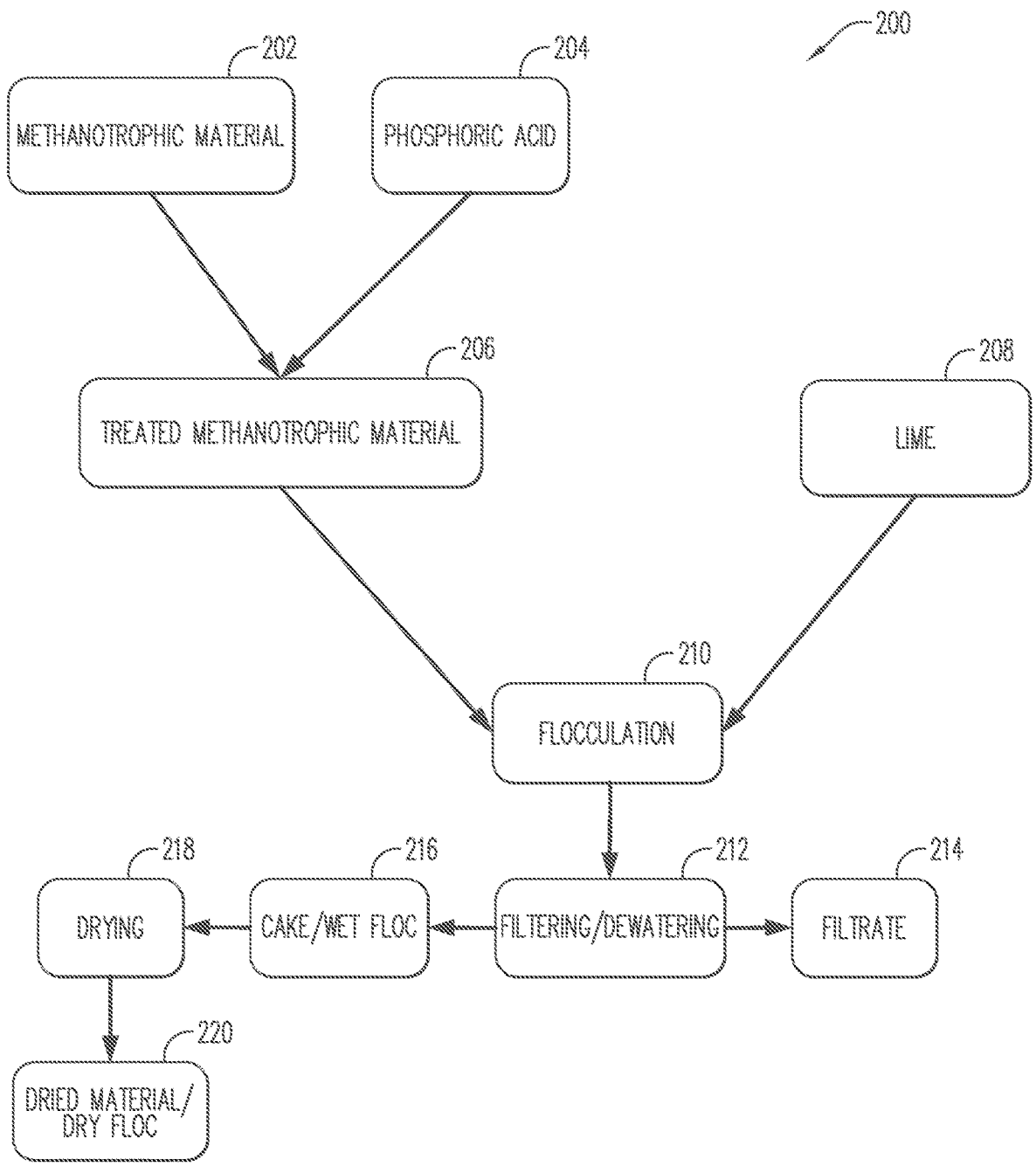
FIG. 2 is a flow diagram according to some embodiments.

Throughout the drawings and the detailed description, unless otherwise described, the same drawing reference numerals will be understood to refer to the same elements, features and structures. The relative size and depiction of these elements may be exaggerated or adjusted for clarity, illustration, and/or convenience.

DETAILED DESCRIPTION

In the following description, details are set forth to provide a thorough understanding of various example embodiments. It should be appreciated that modifications to the embodiments will be readily apparent to those skilled in the art, and generic principles defined herein may be applied to other embodiments and applications without departing from the spirit and scope of the disclosure. Moreover, in the following description, numerous details are set forth as an explanation. However, one of ordinary skill in the art should understand that embodiments may be practiced without the use of these specific details. In other instances, well-known structures and processes are not shown or described so as not to obscure the description with unnecessary detail. Thus, the present disclosure is not intended to be limited to the embodiments shown but is to be accorded the widest scope consistent with the principles and features herein. It should be appreciated that in the development of any such actual implementation, as in any engineering or design project, numerous implementation-specific decisions must be made to achieve the specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Biological conversion of methane to valuable products can mitigate methane-induced global warming as greenhouse gas. Methanotrophs are bacteria capable of using methane as their sole source of carbon and energy, and may therefore be used in the conversion of methane. The methanotrophs may oxidize methane thereby reducing the release of methane to the atmosphere from landfill sites, wetlands and rice paddies. Once the methanotrophs are spent (e.g., no longer able to convert methane), the spent methanotrophs may be used (e.g., ingested or applied) by other animals.

The spent methanotrophs may be further processed prior to use by other animals. For example, the spent methanotrophs may be filtered from a medium used to grow the methanotrophs during the conversion. Non-exhaustive examples of filtering may be via filter pressing, the use of gravity and a filter cloth, mechanical filtering through capillary suction, vacuum and pressure filtration methods, membrane cross flow filtration, as well as the use of centrifuges (liquid-solid separation devices that separate by density). However, at least in the case of the centrifuge, operating the centrifuge use a large amount of energy, which may be undesirable.

Some processes may be used to enhance filtration efficiency, such as flocculation. As described above, flocculation is a process used in liquid-solid separation to enhance filtration efficiency, by aggregating small particles into bigger particles (flocs) prior to filtration. Cells may be induced to flocculate by the addition of various chemical agents ("synthetic flocculent"). Synthetic flocculent may be polymers that facilitate flocculation because the synthetic flocculent's high molecular weight in combination with charged sites enables the bridging together of solids (cells). However, with respect to spent methanotrophs and their future use (e.g., ingested or applied) by other animals, it may be undesirable to use chemical agents in the flocculation process. Additionally, while non-synthetic flocculants may be used, such as chitosan, these non-synthetic flocculants may still be questionable in terms of their toxicity due to the large amount that is sometimes required (not to mention the unpredictability of dosage required from batch to batch being that it is a natural product) to enable flocculation, which may be undesirable with respect to spent methanotrophs and their future use (e.g., ingested or applied) by other animals. The inventor notes that coagulation is different from flocculation in terms of scale. Coagulation forms microflocs and flocculation is the bridging of these microflocs to form bigger flocs (macroflocs). Coagulation is reversible, while flocculation is not.

Embodiments provide an alkaline flocculation mechanism whereby methanotrophic material is first treated with phosphoric acid. The methanotrophic material may be treated with phosphoric acid simply by mixing the methanotrophic material with phosphoric acid in an amount as described below with respect to the Example. The treated methanotrophic material is subsequently treated with a lime solution (e.g., calcium oxide (CaO) or calcium hydroxide ($Ca(OH)_2$), or any other suitable calcium-containing inorganic mineral) in an amount as described below with respect to the Example. After an incubation time of approximately one to two minutes, and with constant gentle mixing, the methanotrophic material begins to floc. It is noted that other suitable incubation times and mixing rates may be used. The aggregated cells undergoing flocculation may be referred to as "floc". In the present invention, the flocs are macroscopic aggregates that settle to the bottom of a liquid culture upon standing.

In one or more embodiments, the floc may be filtered to form a cake. The cake may then be dried, via vacuum drying, for example, to form a dried powder. In one or more embodiments, the vacuum drying may be via an indirect vacuum drier. The inventor notes that the material described by embodiments may not foul a drying surface when dried via the indirect vacuum dryer, whereas drying of the material not treated as described in the embodiments may result in fouling of the drying surface of the vacuum drier to a very high degree. Additionally, drying of the material not treated as described in the embodiments may produce an off color and undesirable dried material. The dried powder may be more easily stored and transported than a wet cake, as a dry powder is lighter/less dense and may take up less space than a wet cake. The inventor also notes that the dried powder may have a much higher bulk density than a conventional spray dried material which heretofore, was the only feasible drying method that produces an acceptable product. Conventionally, spray drying is a process in which liquid is transformed into dried particles by spraying the feed into a hot drying medium. A high bulk density material may represent substantial savings in the shipping cost of the resultant product. As shown in the below Example, a small amount of calcium phosphate ($Ca_2(PO_4)_2$) is produced and ends up mixed with the protein (methanotrophic material). The ratio of calcium phosphate to protein is very low (e.g., a range of 12.22 g protein/1 g $Ca_3(PO_4)_2$ to 1008.365 g protein/1 g $Ca_3(PO_4)_2$). While calcium phosphate may actually be beneficial as an additive to animal feed, in a case that it is necessary to remove the calcium phosphate from the protein in order to produce a pure proteinaceous material, the calcium phosphate may be separated from the protein through a centrifugal process such as shaking tables (similar to rice winnowing) or cyclones, or any other suitable process. The specific gravity of calcium phosphate may be significantly higher than that of the protein.

FIGS. 1-4B include a flow diagram of a process 100 (FIG. 1) for flocculating a methanotrophic material according to some embodiments. While the examples herein are described with respect to a methanotrophic material, the process may apply to other nutritional materials.

Initially at S110 a methanotrophic material 202 is provided. The methanotrophic material 202 may be any suitable bacteria or archaea that metabolizes methane as its source of carbon and energy. A strain of methanotrophic material may be obtained from any suitable source, for example, from a company who produces protein by growing methanotrophs in natural gas. The methanotrophic material 202 may be provided in an aqueous medium extracted from a fermentation tank, or in any other suitable form. The methanotrophic material may be in an amount of 1-4 grams and the medium in an amount of 96-99 grams, such that after the material is suspended in the medium (together forming a "mixture"), the material is present in a concentration of 1-4% Total Suspended Solids (TSS). The methanotrophic material 202 may be provided in a spent state, meaning the methanotrophic material is no longer able to metabolize methane. The provided methanotrophic material 202 may have a pH of 7. The provided methanotrophic material 202 may also have a density of 1 gm/ml.

Then in S112, the methanotrophic material 202 is treated with phosphoric acid 204. As described above, the methanotrophic material 202 may be treated with phosphoric acid 204 simply by mixing the methanotrophic material 202 with phosphoric acid 204 in an amount indicated in the EXAMPLE described below. The mixing may be constant and at a vigorous rate. It is noted that a gentle mixing rate vs a vigorous mixing rate is a qualitative description that technicians skilled in the art of flocculation are familiar with. As described above, for example, coagulation is reversible, while flocculation is irreversible. As such, when mixing a coagulant with a material, a lot of shear energy may be applied because the material re-coagulates after the shear energy is removed (reversible), whereas, in flocculation, shear energy is judiciously applied to provide enough mixing while taking care that the flocs are not destroyed because the destruction of floc is irreversible (e.g., floc does not reform when the shear energy is removed). Other suitable ratios and rates may be used. The treated methanotrophic material 206 may have a pH of about 4.5. The treated methanotrophic material 206 may also slightly coagulate at this stage to an observable degree. It is noted that while the process described herein includes a step of treating the methanotrophic material with phosphoric acid, in some embodiments, the methanotrophic material may be provided at S110 in an already treated state, having a dose of phosphoric acid previously applied thereto.

The treated methanotrophic material 206 is next mixed with a lime solution 208 at S114. The lime solution 208 may be calcium oxide (CaO) or calcium hydroxide ($Ca(OH)_2$), or any other suitable calcium-containing inorganic mineral. The amount of lime added is indicated in the EXAMPLE below.

Figure 3A:
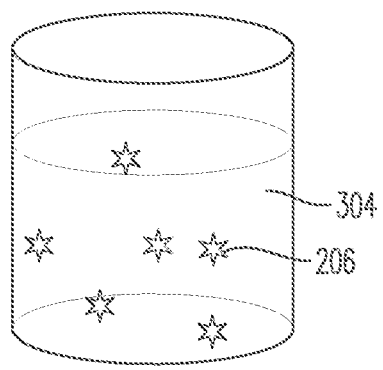
FIG. 3A is a diagram illustrating a non-flocced mixture according to some embodiments.
Figure 3B:
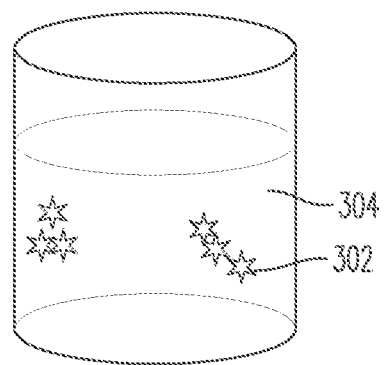
FIG. 3B is a diagram illustrated a flocced mixture according to some embodiments.

After an incubation time of one to two minutes, and with constant mixing at a gentle rate, the methanotrophic material begins to floc 210 at S116. The addition of the lime solution 208 may increase the pH and induce flocculation. The pH of the flocculated material may increase to 8.5-9. The flocculation 210 may be a form of alkaline (high pH induced) flocculation. In one or more embodiments, the alkaline flocculation is a result of the lime solution reacting with the phosphoric acid to form calcium phosphate precipitates. It has been suggested that flocculation induced by the addition of the lime may be a result of neutralization of the surface charge of the treated methanotrophic material by oppositely charged precipitates. The neutralized particles may allow Van der Waals forces to take effect and floc the treated methanotrophic material. Not wishing to be bound by it, the inventor suggests an alternative possible reason for the flocculation—namely, the lime may cause osmotic pressure to expel a protein from the treated methanotrophic material. The expelled protein may then act as the flocculant (a high molecular weight substance) that acts as an "adhesive" for the particles in the treated methanotrophic material. Again, not wishing to be bound by it, the inventor offers yet another possible alternative reason for flocculation—namely, the lime may change another aspect (e.g., enzyme, starch, etc.) of the treated methanotrophic material in a way that makes the changed aspect act as an "adhesive" for the particles in the treated methanotrophic material. The clumping of the methanotrophic material into flocs may reduce the turbidity of the medium 304 in which the methanotrophic material was provided, as shown in FIGS. 3A and 3B.

After the flocculation 210, the floc 302 is de-liquored (separated or isolated from the medium 304) in S118 via any suitable filtering/dewatering process 212. The separated medium 304 may be referred to as a filtrate 214. The separated floc may be referred to as a "cake" and in particular, a "wet cake" or "wet floc" 216. The wet floc 216 may also have an anti-fouling property, as described further below with respect to FIGS. 4A/4B.

The medium 304 may also contain, in addition to water, certain additional materials that may be further harvested. As such, in some embodiments, after the floc 302 is de-liquored, the liquor (which has been separated from the proteinaceous mass) may be further processed via membrane filtration or other suitable process whereby other materials (e.g., liquid hydrocarbons) are separated from the water phase and further concentrated. The inventor notes that since the floc described herein does not use synthetic polymers (which may foul membranes), the liquor from the de-liquoring process may be subjected to membrane separation without the deleterious effects of membrane fouling.

In S120, the wet floc 216 is dried by a drying/dehydrating process 218. Drying may be via any suitable drying/dehydrating process 218, including, but not limited to, press filters, vacuum dryers/dehydrators, belt press dehydrator, centrifugation dehydrator, screw press, etc. The drying/dehydrating process 218 may continue until the dried floc has a dryness level of about 95% Total Solids (TS).

In some embodiments, the drying process 218 may dry the floc 216 via an indirect dryer, such as a vacuum indirect dryer. The vacuum indirect dryer may heat the wet floc 216 up to a boiling point of any volatiles (e.g., water, hydrocarbons, etc.) therein, so that the volatiles evaporate. As a non-exhaustive example, if the volatile is water, the boiling point is 100 degrees Celsius, so the vacuum dryer ("heat transfer medium") may produce heat that is between 125 degrees Celsius and 200 degrees Celsius, and up to 350 degrees Celsius. In a case the volatile is heat sensitive, as may be with foods and other materials (e.g., methanotrophic floc) that have starches, proteins and/or sugars, vacuum drying may be used to lower the boiling point to as low as 60 degrees Celsius, at which point thermal fluid as low as 80 degrees Celsius may be used, since the coefficient of heat transfer is directly proportional to the delta T (in this case, 80 degrees Celsius minus 60 degrees Celsius).

In one or more embodiments, a time of the drying/dehydrating process 218 may be based on the overall heat transfer coefficient of the wet floc, and the temperature it may sustain. As a non-exhaustive example regarding the temperature, the proteinaceous (methanotrophic) material may be adversely affected (e.g., degraded and/or discolored) at a certain temperature, typically in the 60 degrees Celsius range.

Figure 4A:
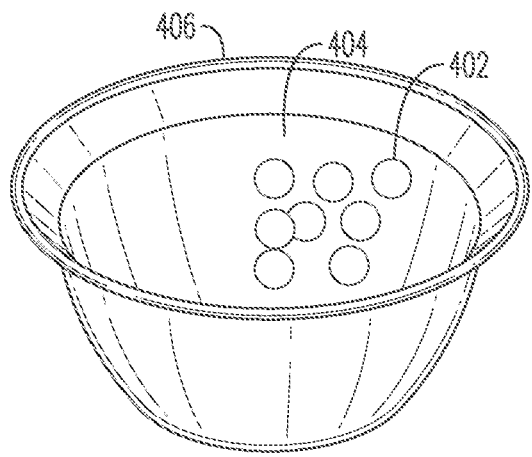
FIG. 4A is a diagram illustrating fouled vacuum dryer.
Figure 4B:
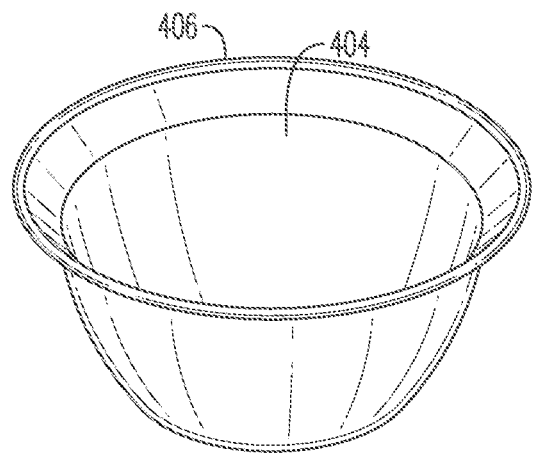
FIG. 4B is a diagram illustrating an un-fouled vacuum dryer according to some embodiments.

Conventionally, when a non-flocculated cake is dried, as by the drying/dehydrating process described above, the cake fouls 402 a metal surface 404 of a vacuum dryer 406, as shown in FIG. 4A. As used herein, "fouling" is the formation of unwanted material deposits on heat transfer surfaces during the process of heating and cooling. The deposits create an insulating layer that inhibits heat transfer, thereby reducing the ability of the vacuum dryer, in this case, to dry the materials. However, the wet floc 216 produced by the steps described herein is "anti-fouling" in that it does not foul the vacuum dryer 406 during the drying/dehydrating process, as shown by the metal surface 404 of the vacuum dryer 406 in FIG. 4B. The dried floc may have a good color and a high bulk density. In one or more embodiments the floc may have "good color" when the color is close the color of material before it is put in the dryer and dried (e.g., not a burnt color).

EXAMPLE

General Procedure for Alkaline Flocculation

First 19 mL of Solution A (85 wt % Phosphoric acid having a density of 1.88 g/mL) was mixed with 200 mL of water to form 219 mL of Solution B (12.88 wt % Phosphoric acid (30.362 g of phosphoric acid, 205.64 g $H_2O$, 236.002 grams total) having a density of 1.0763 g/mL). Twenty (20) mL of solution B were then mixed with two thousand (2000) mL of Substrate Solution (2.68% TSS, 53.6 g protein (methanotrophic material), 3.47% Total Solid (TS) (69.4 grams solids) dryness level, having a density of 1 g/ml) to form 2020 mL of Solution C (0.137 w % phosphoric acid (2.773 grams phosphoric acid, 69.4 gram solids, 1949.353 grams $H_2O$, 2021.256 grams total), 2.65% TSS, 53.6 g protein, 3.43% TS (69.4 grams solids), having a density of 1.0007 g/mL).

Next Reaction 1 is executed to generate a Calcium Hydroxide Solution, where Reaction 1 is

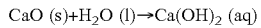

Reaction 1 may use 90 mL of water with ten (10) grams of crystallized CaO to generate 90 mL of a Calcium Hydroxide Solution having a density of 1.001 g/mL (soluble—excluding insoluble CaO, and having 0.14136 g of $Ca(OH)_2$, 89.9656 g $H_2O$, 90.107 g total), a density of 1.11 g/mL (soluble+insoluble—includes insoluble CaO, and having 0.14136 g $Ca(OH)_2$, 89.9656 g $H_2O$, 9.893 g insoluble CaO, and 100 g total), 0.001908 moles $Ca(OH)_2$ and 0.0212 M $Ca(OH)_2$.

Then Reaction 2 is executed to generate a Final Mixture, where Reaction 2 is

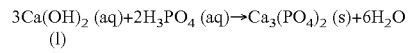

Reaction 2 may use six (6) mL of the Calcium Hydroxide Solution and 500 mL of Solution C, such that a ratio of Calcium Hydroxide Solution to treated Methanotrophic material is 83:1, to generate 506 mL of the Final Mixture having a density of 1.002 g/mL, a 0.1353 wt. % of phosphoric acid (before reaction), 0.685 g phosphoric acid (before reaction), 17.16 g solids, 0.00942 g $Ca(OH)_2$ (before reaction), 488.5016 g water, 506.356 g total, 2.619% TSS, 13.26 g protein, 3.388% TS, 17.16 g solids, 0.0001272 moles Ca(OH)2 (before reaction), 0.007 moles phosphoric acid (before reaction), and 0.0000424 moles $Ca_3(PO_4)_2$ (after reaction), and 0.01315 g $Ca_3(PO_4)_2$ (after reaction).

The final ratio of protein to calcium phosphate is a range of 12.22 g protein/1 g $Ca_3(PO_4)_2$, to 1008.365 g protein/1 g $Ca_3(PO_4)_2$, and may be at least 100 g protein/1 g $Ca_3(PO_4)_2$ If desired, the different steps discussed herein may be performed in a different order and/or concurrently with each other. Furthermore, if desired, one or more of the above-described steps may be optional or may be combined.

While the foregoing invention has been described with respect to various embodiments and examples, it is understood that other embodiments are within the scope of the present invention as expressed in the following claims and their equivalents. Moreover, the above specific examples are to be construed as merely illustrative, and not limitative of the remainder of the disclosure in any way whatsoever. Without further elaboration, the embodiments described are solely for the purpose of illustration. Those skilled in the art will recognize other embodiments may be practiced and modifications and alterations limited only by the claims.

What is claimed is:

1. A method comprising:
   providing a methanotrophic material having an amount of 2.68% Total Suspended Solids (TSS);
   treating the methanotrophic material with phosphoric acid;
   providing a lime solution in an amount of 0.0212 M;
   combining the treated methanotrophic material with the lime to increase a pH of the solution and to precipitate calcium phosphate;
   generating a flocculated material by flocculating the combined lime and treated methanotrophic material.

2. The method of claim 1, wherein the ratio of treated methanotrophic material to lime is about 83 to 1.

3. The method of claim 1, wherein the flocculation is alkaline flocculation.

4. The method of claim 1, wherein the methanotrophic material is provided in a medium.

5. The method of claim 4, further comprising:
   deliquoring the flocculated material from the medium.

6. The method of claim 5, further comprising:
   drying the deliquored flocculated material at a temperature of 60 degrees Celsius via a vacuum.

7. The method of claim 6, wherein the drying is via an indirect dryer.

8. The method of claim 7, wherein the dried deliquored flocculated material is anti-fouling.

9. The method of claim 1, wherein the treated methanotrophic material has a pH of 4.5 and the flocculated material has a pH of 8.5-9.

10. A flocculated material comprising a methanotrophic material having an amount of 2.65% TSS suspended in a medium, the methanotrophic material including a dose of phosphoric acid, wherein the methanotrophic material is adapted to flocculate in lime, wherein the lime is in an amount of 0.0212M.

11. The flocculated material of claim 10 wherein the treated methanotrophic material has a pH of 4.5 and the flocculated material has a pH of 8.5-9.

12. The flocculated material of claim 10, wherein the flocculated material is anti-fouling.

13. A product prepared by:
    mixing a methanotrophic material with a medium to form a first mixture, wherein the methanotrophic material in the first mixture is present in a concentration of 1-3% TSS, wherein the methanotrophic material is treated with phosphoric acid prior to mixing;
    adding a lime solution to the first mixture to form a second mixture, wherein a ratio of the first mixture to the lime solution is about 83 to 1; and
    flocculating the second mixture to form a plurality of flocs, wherein the flocs are a product.

14. The product of claim 13, wherein the flocked material is deliquored and dried at 60 degrees Celsius temperature until a dryness level is about 95% Total Solids (TS).

15. The product of claim 13, wherein the methanotrophic material is provided in an amount of one to two grams, and the medium is provided in an amount of 98-99 grams.

16. The product of claim 13, wherein the methanotrophic material is present in a concentration of 2.65% TSS.

* * * * *